(12) United States Patent
Besnard et al.

(10) Patent No.: US 10,063,933 B2
(45) Date of Patent: Aug. 28, 2018

(54) CONTROLLING SPEED OF THE DISPLAY OF SUB-TITLES

(71) Applicant: Harmonic, Inc., San Jose, CA (US)

(72) Inventors: Xavier Besnard, Acigne (FR); Michel Jouan, Saint Aubin du Cormier (FR)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 15/510,412

(22) PCT Filed: Sep. 11, 2015

(86) PCT No.: PCT/EP2015/070841
§ 371 (c)(1),
(2) Date: Mar. 10, 2017

(87) PCT Pub. No.: WO2016/041861
PCT Pub. Date: Mar. 24, 2016

(65) Prior Publication Data
US 2017/0311045 A1  Oct. 26, 2017

(30) Foreign Application Priority Data

Sep. 17, 2014 (FR) .................. 14 58794

(51) Int. Cl.
*H04N 5/278* (2006.01)
*H04N 9/74* (2006.01)
(Continued)

(52) U.S. Cl.
CPC ..... *H04N 21/4884* (2013.01); *H04N 5/44508* (2013.01); *H04N 5/44513* (2013.01);
(Continued)

(58) Field of Classification Search
CPC ........... H04N 21/4884; H04N 21/4307; H04N 21/8547; H04N 5/44508; H04N 5/44513;
(Continued)

(56) References Cited

U.S. PATENT DOCUMENTS

| | | | |
|---|---|---|---|
| 2008/0085099 A1* | 4/2008 | Guihot | G11B 27/10 386/201 |
| 2014/0198252 A1 | 7/2014 | Pornprasitsakul et al. | |
| 2015/0215564 A1* | 7/2015 | Robinson | H04N 5/44508 348/468 |

OTHER PUBLICATIONS

Anonymous, "Subtitle Edit 3.3 Help", Niksedk, XP055195234, Jun. 25, 2014, 16 pages.
(Continued)

*Primary Examiner* — Sherrie Hsia
(74) *Attorney, Agent, or Firm* — Brokaw Patent Law PC; Christopher J. Brokaw

(57) ABSTRACT

Applying a presentation timestamp to an element of a sequence of sub-titles. A minimum presentation timestamp $T_{MIN}$ of an element of a sequence of sub-titles N is initialized. The presentation timestamp T(N) of the new element of a sub-title sequence N is compared with the minimum presentation timestamp for sub-titles $T_{MIN}$. The minimum presentation timestamp for sub-titles $T_{MIN}$ is applied to the element of a sequence of sub-titles N if the presentation timestamp T(N) of the new sub-titles element is prior to the minimum presentation timestamp for sub-titles $T_{MIN}$. The minimum presentation timestamp for sub-titles $T_{MIN}$ for an element of a sequence of sub-titles N+1 is calculated as a timestamp posterior to the presentation timestamp T(N) of the new sub-titles element.

24 Claims, 5 Drawing Sheets

(51) Int. Cl.
*H04N 21/488* (2011.01)
*H04N 5/445* (2011.01)
*H04N 21/8547* (2011.01)
*H04N 21/43* (2011.01)

(52) U.S. Cl.
CPC ..... *H04N 21/4307* (2013.01); *H04N 21/8547* (2013.01); *H04N 2005/44526* (2013.01)

(58) Field of Classification Search
CPC ......... H04N 2005/44526; H04N 5/278; H04N 9/74; H04N 9/76; H04N 7/00; H04N 11/00
USPC .............................. 348/464, 468, 589, 600
See application file for complete search history.

(56) References Cited

OTHER PUBLICATIONS

Niksedk, "FixCommonErrors.cs", GitHub, Subtitle Edit, XP055195867, Sep. 12, 2014, 5 pages.
Anonymous, "How to subtitle offline", OT Pedia, XP055195237, Aug. 17, 2014, 6 pages.
Anonymous, "File:Sesettings.png", OT Pedia, XP055195243, Jul. 31, 2014, 2 pages.
European Patent Office, International Searching Authority, International Search Report and Written Opinion of the International Searching Authority for International Application No. PCT/EP2015/070841, International Filing Date: Sep. 11, 2015, 15 pages.

* cited by examiner

```
20b ─ <?xml version="1.0" encoding="UTF-8"?>
        <tt:tt xml:lang="en" ...>  ─ 200b
210b ─    <tt:head>
              <tt:metadata>
              <tt:styling>
              <tt:layout>
          </tt:head>
          <tt:body>          221b      222b         223b
220b ─      <tt:div>
              <tt:p xml:id="sub2" end="00:00:04:21" begin="00:00:02:14" ...>
                <tt:br/>
                <tt:span style="WhiteOnBlack"> ─ 224b
                    Hello this is an example of
                </tt:span>
              </tt:p>                         225b
            </tt:div>
          </tt:body>
        </tt:tt>
```

CONTROLLING SPEED OF THE DISPLAY OF SUB-TITLES

CLAIM OF PRIORITY

The present application is a U.S. National Stage Application under 35 USC § 371 of PCT Patent Application No. PCT/EP2015/070841, entitled "Method of Controlling the Speed of Display of Sub-Titles," filed Sep. 11, 2015, having a priority date of Sep. 17, 2014, the disclosure of which is hereby incorporated by reference for all purposes in its entirety as if fully set forth herein.

FIELD OF THE INVENTION

Embodiments of the invention generally relate to the field of video sub-titling.

BACKGROUND

The application of sub-titles is an important element in video stream production. Sub-titles enable a user to have a better understanding of the content of the video, and particularly of the speech uttered, when the latter is hardly, if at all, understandable. This is particularly useful when a program is transmitted in a language not known to the user or when the auditory perception of the language is disturbed by poor transmission, poorly articulated speech, or background noise. Sub-titles also enable the hard of hearing to achieve an understanding of the program.

The application of sub-titles may be performed either offline or in real time (so-called "live" sub-titles in the parlance of the art). The application of sub-titles offline is performed on a support prepared in advance. This type of sub-titling is found, for example, in DVDs, Blu-ray discs, or transmissions broadcast offline. This offline application does not present any particular time constraint. Thus, it is possible in this case to manually insert sub-titles into the video stream, an operator verifying that the sub-titles are perfectly synchronized with the video, while presenting a visual aspect perceived to be pleasant by the user. Although subjective, this notion of pleasant perception of the sub-titles can be reduced to objective elements, for example, obtaining sub-titles which are displayed at a moderate speed, or which retain a fixed position with respect to the screen. It is also possible to use audio analysis schemes which may turn out to be expensive with respect to calculation time for purposes of best synchronizing the sub-titles with the audio/video.

On the other hand, it is not possible to use these techniques in the case of live sub-titles, as in this case the video content produced is transmitted immediately. The production of live sub-titles is generally performed by an operator producing the sub-titles live and dispatching them in the stream. This operation produces an inevitable lag between the moment at which the video is transmitted and the moment at which the corresponding sub-title is produced. This lag is still more significant when the task of the operator induces a translation from one language to the other for the production of the sub-titles.

The approach generally used to process live sub-titles is to transmit each word of sub-titles as soon as it is available in order not to add any further lag. However, this approach has drawbacks, e.g., in addition to an inevitable lag, the words arrive one after another, sometimes in a very fast manner. The live sub-titles are thus often perceived by users as unpleasant and of poor quality. The speed of appearance of the words forming sub-titles has been listed as one of the main causes of poor perception of live sub-titles by users by Ofcom (Office of Communications), *The quality of live subtitling*, pp. 29-30. According to this study, users seem to prefer sub-titles presented in blocks.

Critical speeds for the display of sub-titles are notably studied in DTV4All, 2010. D2.5: *Final Report on Pilot Services* (2 of 2), *UK Evaluation Report (Roehampton)*, pp. 6 to 9. This document shows notably the evaluation of quality of the sub-titles as a function of the number of words per minute (also abbreviated to "wpm" in the technical field concerned). The study shows that sub-titles comprising 180 words per minute are assessed as being of "good quality" by a much more significant percentage of users than sub-titles comprising 220 words per minute.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1A:
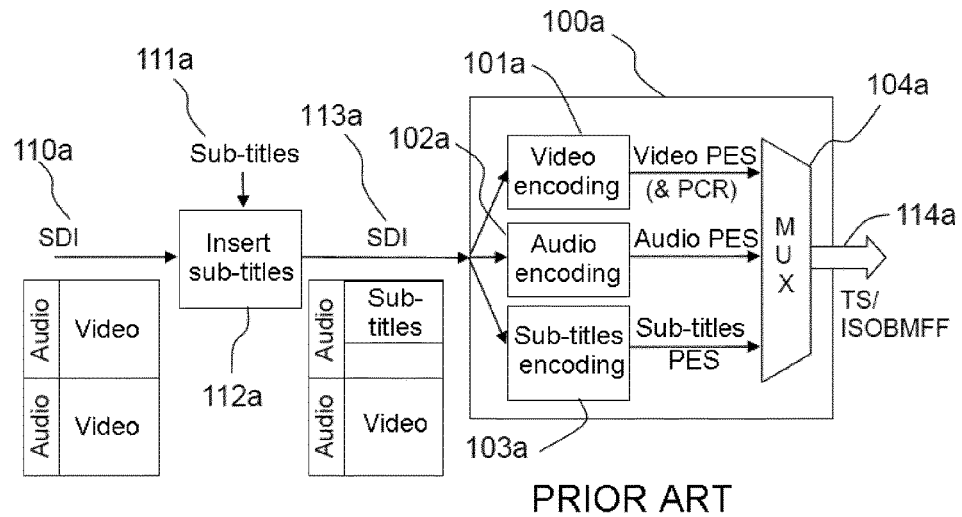
FIG. 1a is an illustration of an exemplary video encoder capable of processing live sub-titles according to the prior art.

Approaches for applying a presentation timestamp to an element of a sequence of sub-titles are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Context and Acronyms

In the subsequent description, embodiments of the invention are illustrated by examples relating to the generation of sub-titles in an encoder and the presentation of sub-titles by a decoder. It is noted that embodiments can be applied to any type of sub-title processing device, such as a transcoder included in a video processing chain.

Certain acronyms customarily used in the technical field of the present patent application may be employed in the course of the description and figures. These acronyms are listed in the table below along with their expression and a description.

| Acronym | Expression | Description |
|---|---|---|
| AAC | Advanced Audio Coding | Audio compression and coding standard. |
| ABR | Adaptive Bit Rate | Describes a multimedia stream whose bitrate can be adapted, notably to provide only the data sufficient to achieve a given quality or to adapt to a transmission capacity. |
| AVC | Advanced Video Coding | Video compression and coding standard, also called H.264. |
| DVB | Digital Video Broadcasting | Consortium that has produced several standards for digital television. Applies also to the standards produced, notably the DVBSUB sub-titles standard, or ETSI EN 300 743 standard. |
| DVBSUB | Digital Video Broadcasting Subtitles | Sub-titling standard issued by the DVB, also designated ETSI EN 300 743. |
| EBU | European Broadcasting Union | International association of radiobroadcasters. The acronym also applies to the standards produced by the organization. |
| EBU-TT | European Broadcasting Union-Timed Text | Sub-titles coding standard produced by the EBU and based on the TTML standard of the W3C. |
| ETSI | European Telecommunication Standard Institute | European standardization body for the telecommunications field. The acronym also applies to the standards produced by the institute. |
| HD | High Definition | Designates a video stream of high resolution and quality, generally exhibiting a high number of bits per second. |
| HEVC | High Efficiency Video Coding | Video compression and coding standard, also called H.265. |
| ISO | International Standard Organisation | Organization for establishing standards, notably in the multimedia field. |
| ISOBMFF | ISO Base Media File Format | Generic file format containing multimedia data. Numerous formats of files, such as the .mp4 or the .m4a, are based on the ISOBMFF. |
| MPEG | Motion Picture Experts Group | Group of experts that has issued standards for multimedia contents. This name is also applied to some of the standards produced, for example the MPEG-2 standard. |
| MPEG-TS | Motion Picture Experts Group - Transport Stream | Standard defining a multimedia transport stream defined by the MPEG committee. |
| OTT | Over The Top | Dispatching of a medium from a content provider to a reader via a standard Internet connection rather than a dedicated infrastructure. |
| PCM | Pulse Code Modulation | Uncompressed digital representation of an analog signal via a sampling technique. |
| PCR | Program Clock Reference | Temporal datum making it possible to synchronize the various multimedia streams within a program in the MPEG-TS streams. |
| PES | Packetized Elementary Stream | Specification dependent on the MPEG-2 standard, and describing the syntax of an elementary stream (video, audio, sub-titles, etc.) within an MPEG-TS stream. A PES stream is divided into PES packets that can be multiplexed with packets of other PES elementary streams within an MPEG-TS stream. |
| PTS | Presentation Timestamp | Indicates a timestamp to which an element must be presented within a stream. |
| SD | Standard Definition | Designates a video stream of average resolution. |
| SDI | Serial Digital Interface | Transport or broadcasting protocol for various multimedia formats, used notably as mode of internal communication between the various modules of a video encoder. |
| SMPTE | Society of Motion Picture and Television Engineers | International association, located in the United States, developing video standards. |
| SMPTE-TT | SMPTE-Timed Text | Sub-titles coding standard devised by the SMPTE and based on W3C TTML. |

| Acronym | Expression | Description |
|---|---|---|
| XML | Extensible Markup Language | Computer language for information markup. |
| W3C | World Wide Web Consortium | Normalization body responsible for promoting the compatibility of Web technologies, notably the XML language. |
| W3C TTML | W3C Timed Text Markup Language | W3C TTML is a technique for presenting a textual support in a manner synchronized with another support, for example audio or video. |

Applying a Presentation Timestamp

Figure 1B:
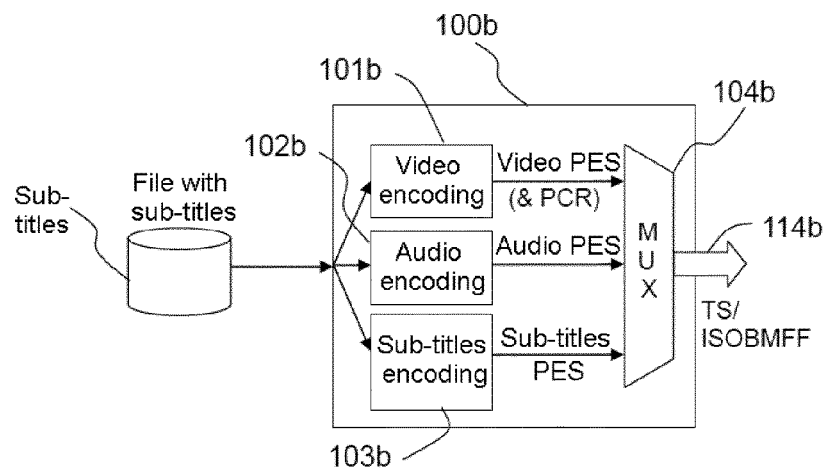
FIG. 1b is an illustration of an exemplary video encoder capable of transcoding a multimedia file according to the prior art.

FIG. 1a is an illustration of an exemplary video encoder capable of processing live sub-titles according to the prior art, while FIG. 1b is an illustration of an exemplary video encoder capable of transcoding a multimedia file according to the prior art. FIG. 1a depicts: (1) a multimedia encoder 100a, itself comprising: a video encoder 101a, an audio encoder 102a, a sub-titles encoder 103a, and a stream multiplexer 104a, (2) a sub-titles inserter 112a, and (3) SDI interfaces making it possible to transmit the multimedia streams within the encoder.

Multimedia encoder 100a produces multimedia streams live, for example, a televised retransmission of live sports events or current weather bulletins. According to a live multimedia content design chain commonplace in the prior art, a multimedia stream 110a containing one or more audio and video channels is produced continuously.

Sub-titles stream 111a is then added in real time to multimedia stream 110a by sub-titles inserter 112a so as to produce a raw multimedia stream 113a containing sub-titles. These sub-titles are generally produced by an operator retranscribing in real time the speech expressed by the content displayed on the screen. In a general manner, the operator writes each word separately, and then dispatches each word written immediately to the sub-titles inserter so as to minimize the latency time between the audio/video content of the video stream and the displayed content of the sub-titles. The sub-titles stream which is produced can thus, according to the variations in speed of writing and understanding of the operator, exhibit variable speeds of presentation of successive words that may, when the speed becomes excessive, impair the quality of the sub-title produced. Indeed, this technique is liable to produce, on certain sequences, appearances of successive words that are extremely fast and that will thus be difficult for the viewer to read. The multimedia stream with sub-titles 113a is then dispatched, for example by way of an SDI protocol, to the multimedia encoder 100a.

The sub-titles inserter can insert a single sub-titles channel into the multimedia stream. Several sub-titles channels may be inserted into the multimedia stream in parallel, notably if the sub-titles must be available in several languages. The sub-titles inserter can insert sub-titles according to all the standards accepted within the SDI protocol. It may, for example, insert sub-titles in the teletext format in the SDI.

Within the multimedia encoder 100a, the various channels of a multimedia stream, such as stream 113a, are separated in order to be processed by the corresponding encoding modules. Each video channel is processed by video encoder 101a, each audio channel is processed by audio encoder 102a, and each sub-titles channel is processed by sub-titles encoder 103a.

Video encoder 101a converts a video stream arising from the SDI into compressed video format to allow the transmission of the video stream with a reduced bitrate. The video stream within the SDI is coded according to the so-called YUV 4:2:2 mode. According to this mode, the pixels are coded in the YUV colorimetric space, within which the so-called "Y" layer contains the luminous intensity information, and the so-called "U" and "V" layers contain the colorimetry information. In YUV 4:2:2 mode, part of the information contained in the U and V layers, considered to be less perceptible by the human eye, is deleted. Video encoder 101a transforms this stream into a compressed stream that exhibits a much lower bitrate. In order to be easily readable, the video streams are generally produced according to established standards, such as the MPEG-2 Video, H.264-AVC, or H.265-HEVC standards.

Audio encoder 102a converts an audio stream arising from the SDI into a compressed audio format to allow the transmission of the audio stream with a reduced bitrate. The audio stream within the SDI is generally coded by PCM. For example, the audio signal PCM sampling values can be 48 kHz and 24 bits, thus signifying that each audio channel comprises 48,000 samples per second, each of them containing a sound intensity value coded on 24 bits. Audio encoder 102a transforms this stream into a compressed audio stream that exhibits a much lower bitrate. In order to be easily readable, the audio streams are generally produced according to established standards, such as the MPEG-3 Audio or MPEG-4-AAC standards.

Sub-titles encoder 103a converts a sub-titles stream arising from the SDI into a standard sub-titles stream for broadcasting. Sub-titles encoder 103a converts, on the basis of the formats carried by the SDI, the sub-titles into a format decodable by standard decoders. The sub-titles carried by the SDI may, for example, be teletext sub-titles. By way of example, sub-titles encoder 103a can convert the sub-titles channels carried by the SDI into sub-titles according to the DVBSUB standard. Sub-titles encoder 103a may also produce sub-titles in accordance with an XML format administered by the W3C and/or any format based on or related to the XML format, such as the Timed Text Markup Language (TTML) standard. The TTML standard allows for flexible coding of sub-titles. The TTML standard, also administered by the W3C, is designed to be a broad standard. More specific standards, such as the EBU-TT and the SMPTE-TT, are based on the TTML standard. As used herein, the expression "one of the W3C TTMS norms," "one of the W3C TTMS standards," and "a norm or standard based on W3C TTML" will refer to the TTML standard of the W3C itself as well as to any standard or norm based upon it, such as the EBU-TT standard or the SMPTE-TT standard.

Stream multiplexer 104a concatenates the audio, video, sub-titles streams arising from the encoders 101a, 102a and 103a within a multimedia stream 114a that can be dispatched to the user. A stream multiplexer can produce a single stream comprising the audio, video and sub-titles streams. A stream multiplexer can also produce several multimedia streams. For example, if the audio and the sub-titles are available in several languages, the stream multiplexer can produce a multimedia stream for each of the languages used. Likewise, if the video encoder 101a is configured to produce several video streams according to several compression levels and/or multiple resolutions, the stream multiplexer 104a can produce a multimedia stream according to several compression and/or resolution levels. This is particularly useful when the stream must be dispatched to clients exhibiting different resolution and/or bandwidth contexts. For example, stream multiplexer 104a can prepare both a high-quality HD stream for televisions connected by cable and an SD stream for mobile kit.

The stream 114a produced by stream multiplexer 104a can notably be of MPEG-TS type for a live transmission. An MPEG-TS stream can contain video, audio, and sub-titles channels, as well as information for synchronizing and describing the available channels. Stream 114a can be produced and dispatched continuously by the multimedia encoder 100a. An MPEG-TS stream permits so-called multicast broadcasting, that is to say for which the encoder produces and broadcasts a single stream, which is received by various receivers. This type of stream is for example customarily used in digital terrestrial television systems.

The multimedia stream produced can also be of the ISOBMFF (ISO Based Media File Format) file format type. This type of file is customarily used for so-called OTT video transmissions. The acronym OTT stands for Over The Top, that is to say on top of the network as a whole. The aim of this mode of transmission is to be able to transmit a multimedia stream via any Internet connection without a dedicated network. This type of stream consists in sequencing the multimedia stream as short files, for example of the order of a few seconds, such as between 1 and 10 seconds. The files can then be dispatched as soon as they are formed to a client or reader. In this type of stream, a manifest file describing the various streams available must be dispatched prior to the multimedia files. This manifest file may for example contain the list of audio and sub-titles channels, if the latter are available in several languages. This type of transmission also permits so-called ABR (Adaptive Bit Rate) modes. In these modes, the video encoder produces several video streams, according to several bitrates, and the stream multiplexer 104a produces small files separated according to these various bitrates. According to the available bandwidth and the requests dispatched by the clients, files exhibiting greater or lesser bitrates are dispatched, in order to adapt the bitrate of the multimedia stream to the transmission capacity for each client.

FIG. 1b represents an exemplary multimedia encoder operating on the basis of a file according to the prior art. Encoder 100b takes as input a multimedia file 113b containing video, audio, and sub-titles channels. Encoder 100b separates the various channels and provides them to video encoder 101b, audio encoder 102b, and sub-titles encoder 103b, which are similar to encoders 101a, 102a and 103a respectively. Encoders 101b and 102b can also comprise decompression means when the audio/video streams of file 113b are compressed. The streams are then decompressed and then re-compressed by the encoders. It is also possible, when the streams present in a file 113b are compressed, not to modify one of them, for example by retaining the initial audio stream, while transcoding the video stream. The sub-titles encoder 103b can also transcode the sub-titles, for example by transforming teletext sub-titles and sub-titles according to one of the TTML standards of the W3C. Sub-titles encoder 103b can also introduce modifications to the sub-titles themselves, for example, by modifying their character fonts or timings.

Multiplexer 104b according to the prior art is capable of multiplexing the various audio, video, sub-titles streams within one or more multimedia streams 114b. Multiplexers 104b and multimedia stream 114b exhibit respectively the same properties as multiplexers 104a and multimedia stream 114a.

Figures 2A, 2B:
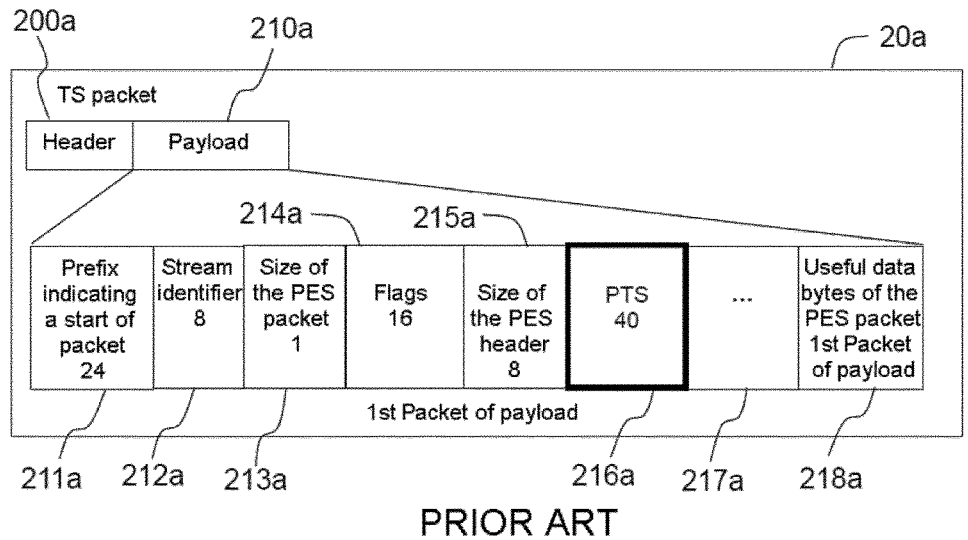
FIG. 2a is an illustration of MPEG-TS multimedia stream structures integrating sub-titles according to the prior art.
FIG. 2b is an illustration of W3C TTML multimedia stream structures integrating sub-titles according to the prior art.

FIGS. 2a and 2b represent diagrams illustrating multimedia stream structures integrating sub-titles, respectively MPEG-TS and EBU-TT, one of the standards based on W3C TTML, according to the prior art. These streams may for example be streams 114a or 114b produced by stream encoders 104a or 104b. Embodiments of the invention can apply to these types of stream, but also to any type of stream integrating timed sub-titles.

FIG. 2a represents the structure of an MPEG-TS stream packet 20a that may contain sub-titles according to the prior art. Packet 20a may for example contain audio, video, or sub-titles, and may comprise a header 200a and useful information 210a. In an embodiment, useful information 210a may include one or more of: a start-of-packet prefix 211a, a stream identifier 212a, a packet size 213a, two bytes termed "flags" making it possible to apply properties to the packet 214a, an item of information regarding packet size 215a, a presentation timestamp, or PTS 216a, various other header fields 217a, and a useful data span 218a.

Header 200a may comprise information regarding synchronization with the whole of the stream. Useful information 210a may comprise the set of information making it possible to present the packet 20a correctly.

Stream identifier 212a allows a reader to determine the stream to which the packet belongs. The various streams can notably be numbered 1, 2, 3, and so on. This identifier refers to description information dispatched in the stream at regular intervals. This description information lists notably the set of streams as well as the data that they contain. Thus, a stream can designate an audio, video, or sub-titles stream whose properties have been defined previously. In particular, the description of the sub-titles stream describes the type of sub-titles stream, for example, the stream may be a sub-titles stream of DVBSUB type. The decoder is thus capable, knowing the type of stream, of decoding the stream via an appropriate decoder or decoding algorithm.

The item of information regarding packet size 215a contains the size of the packet. It allows a decoder to recover the set of useful information of the packet, so as to decode the latter correctly.

Presentation timestamp 216a contains the timestamp at which the sub-title contained in the packet must be displayed. This timestamp is expressed in a reference common to the audio, video, and sub-titles packets, thereby making it possible to display these three data in a synchronized manner. The unit of the timestamp is standardized (the PTSs are referred to a time unit of 90,000 samples per second), and the initial timestamp is defined by the service clock, which corresponds to the timestamp for the start of presentation of the program in the decoder. A decoder is therefore capable, on the basis of these data, of displaying the sub-titles in a manner synchronized with the audio and the video.

Useful data span 218a contains the raw data related to the sub-titles element to be presented. For example, if the sub-titles stream complies with the DVBSUB standard, this may entail an image of bitmap type according to the terminology commonly accepted in this technical field. In this case, each sub-titles element is represented in the form of an image displayed superimposed with the video. For each image, the values of luminous intensity of each pixel are stored one after another to form an image representative of the characters to be transmitted in the sub-title.

FIG. 2b represents a sequence of sub-titles 200b according to one of the standards based on W3C TTML according to the prior art. A sub-title according to this standard is organized in a hierarchical manner with various levels of XML tags. The sequence of sub-titles 200b comprises notably a header 210b. Header 210b contains notably information on the various styles (fonts, sizes of characters, colors, alignments, and the like) to be applied to the sub-title. Header 210b can also contain an item of information about the language of the sub-titles 200b, "en" signifying English in this instance.

The sequence of sub-titles 200b also contains, for each element, a section termed "div" 220b. An element can comprise a word, a sentence, a line, or any other series of characters that can be displayed on a screen. The div section 220b contains an identifier number 221b, a start timestamp 223b characterizing the start moment of the display of the sub-titles elements, and an end timestamp 223b characterizing the end moment of the display of the sub-titles element. The start and end timestamps are expressed in absolute hours, minutes, seconds, and milliseconds in this example. The reader can thus synchronize the presentation of the sub-titles element with the audio and the video. The div section 220b may also comprise style information 224b that provides indications on the manner in which a sub-titles element should be displayed, for example, the color, character font, or the alignment. The text 225b to be displayed is also included in a <tt:span> tag.

In an encoder 100a or 100b according to the prior art, the display timestamps of the sub-titles, for example the presentation timestamps 216a or 223b, are equal to the presentation timestamps of each element of the sequence of sub-titles of the incoming stream or file, for example stream 113a or file 113b. When these sub-titles are produced live, these sub-titles elements may exhibit an excessive display speed and induce an unpleasant user experience.

Embodiments of the invention advantageously provide for an approach for applying a presentation timestamp to a sub-titles element. Embodiments can be employed in any technical context that processes sequences of timed sub-titles. For example, embodiments may be integrated into sub-titles encoders 103a or 103b. Embodiments can be used in conjunction with any format of timed sub-titles. For example, embodiments may be employed with MPEG-TS sub-titles packets 20a or sequences of sub-titles complying with one of the TTML standards of the W3C 20b. It should however be noted that these examples are provided solely by way of indication. Thus, embodiments may also be employed upon a decoder which will apply a presentation timestamp to the sub-titles at the moment of decoding and before displaying the sub-titles at this timestamp. Embodiments of the invention may also be embodied using a transcoder, which will modify only the timestamps of the sub-titles without creating new sub-titles elements to modify the content thereof.

Figure 3:
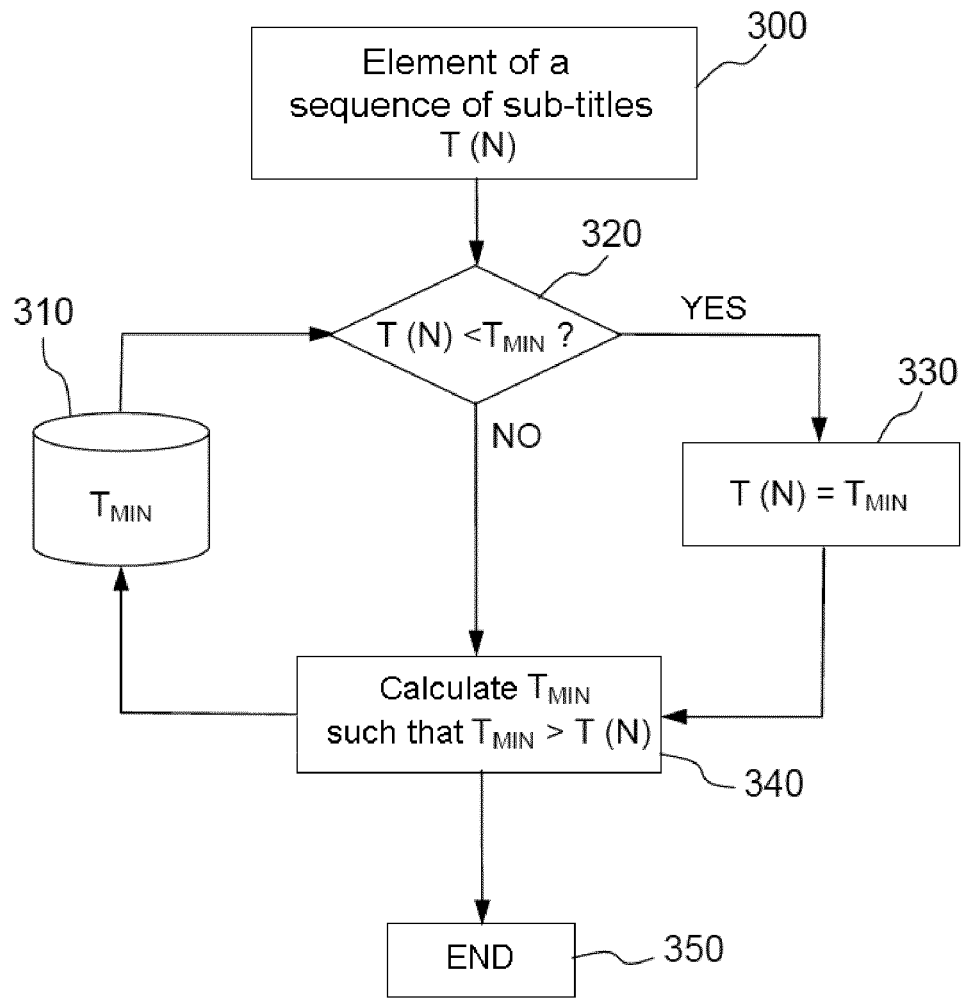
FIG. 3 is a flowchart illustrating an approach for applying a presentation timestamp to an element of a sequence of sub-titles according to an embodiment of the invention.

FIG. 3 is a flowchart of the steps involved in creating a sub-titles stream or file composed of sub-titles elements according to an embodiment of the invention. The steps of FIG. 3 may be performed for each element N of a sequence of sub-titles T. In step 310, a minimum presentation timestamp $T_{MIN}$ of an element of a sequence of sub-titles N is initialized. Thereafter, in step 320, the presentation timestamp T(N) of the new element of a sub-title sequence N is compared to the minimum presentation timestamp for sub-titles $T_{MIN}$. As shown in FIG. 3, if the presentation timestamp T(N) of the new sub-titles element is prior to the minimum presentation timestamp for sub-titles $T_{MIN}$, then in step 330, the minimum presentation timestamp for sub-titles $T_{MIN}$ is applied to the element of a sequence of sub-titles N. Otherwise, as shown in step 340, the minimum presentation timestamp $T_{MIN}$ of an element of a sequence of sub-titles N is set to be greater than the presentation timestamp T(N) of the new element of a sub-title sequence N.

Advantageously, upon the completion of these steps the minimum presentation timestamp for sub-titles $T_{MIN}$ 310 for an element of a sequence of sub-titles N+1, as a timestamp posterior to the presentation timestamp T(N) of the new sub-titles element 340 is recalculated.

Embodiments apply to each element N of a sequence of sub-titles (300). The letter N refers to the number of sub-titles elements within the sequence. A sub-titles element can notably be composed of one or more MPEG-TS packets of a sequence of sub-titles 200a, or a div section of a file complying with one of the TTML norms of the W3C 220b. Within the framework of the MPEG-TS standard, a packet is dimensioned to contain 184 bytes of data. A sub-titles element is often more voluminous (a DVBSUB packet often exceeding a kilobyte). As a result, it is often necessary to distribute the content of the sub-titles element over several MPEG-TS packets. The expression "sequence of sub-titles" is intended to refer to a string of sub-titles elements having to be displayed one after another in a coherent manner. In particular, when a multimedia stream comprises several sub-titles channels, for example as would be the case when supporting multiple languages, a sequence of sub-titles is identified by a common identifier, for example a stream identifier 212a or 221b. Moreover, in the case of a stream of OTT type comprising the dispatching of several successive files, the sequence of sub-titles can represent a sub-titles channel within one of these files, but also a sub-titles channel within several successive files. The application of embodiments of the invention to a sub-titles channel over several successive files makes it possible in particular to retain coherence between the sub-titles display timestamps, even with the dispatching of numerous successive files. Each sub-titles element 300 comprises a timestamp T(N), expressed for example by a PTS 216a in the case of an MPEG-TS stream, or a "begin" field 223b in the case of a sub-title according to one of the TTML standards of the W3C.

In an embodiment, step 310 involves initializing a minimum presentation timestamp for sub-titles $T_{MIN}$. This minimum presentation timestamp corresponds, for each sub-titles element N, to the minimum timestamp at which the sub-title must be displayed in order not to cause overly fast display which is unpleasant for the user. It can notably be expressed in the same time base as the sequence of sub-titles. Preferably, it can be initialized to the timestamp considered to be the start of the multimedia stream. In the case of an MPEG-TS stream, this may entail a relative timestamp based on a counter situated in the coder. In the case of a file complying with one of the TTML standards of the W3C, this may entail an absolute timestamp based expressed in hours, minutes, seconds, milliseconds.

In an embodiment, in step 320, the display timestamp T(N) for each sub-title element N is compared with the minimum presentation timestamp $T_{MIN}$. If the two timestamps are expressed with the same origins and units, then these two values are compared directly; if these two timestamps are not expressed with the same origins and units, then one timestamp can be converted to the format of the other timestamp so that a meaningful comparison may be made between the two timestamps.

If the presentation timestamp for the sub-title element N identifies a time later than the time identified by the minimum presentation timestamp $T_{MIN}$, step 340 is activated directly. In the converse case, step 330 is activated beforehand.

In an embodiment, in step 330, the minimum presentation timestamp $T_{MIN}$ is applied to the sub-title element N. An embodiment of the invention may be implemented using an encoder, such as encoder 103a and 103b. In such an embodiment, in step 330, the encoder writes, during the formation of the sub-titles element, the timestamp $T_{MIN}$ for the corresponding element of the sub-titles stream. If the sub-titles stream is a stream of MPEG-TS type, this timestamp can be written within a Presentation Timestamp 216a. If the sub-titles stream is of the type according to one of the TTML standards of the W3C, then this timestamp can be written within a "begin" field 223b.

An embodiment of the invention may be implemented using a decoder. In such case, the timestamp of step 330 may correspond to a presentation timestamp stored in memory for the display of the sub-title. It is then possible to replace this timestamp by the timestamp $T_{MIN}$, and then to display the sub-titles element at the desired timestamp.

An embodiment of the invention may also be implemented using a transcoder, in which case step 330 may be performed by the replacement of the datum representative of the timestamp in the sub-titles stream, for example a PTS 216a or a "begin" field 223b, by the timestamp $T_{MIN}$. If the sub-titles element also contains an end-of-display timestamp, for example the "end" field 222b, it is possible, within step 330, to modify the value of this field so that the sub-titles element retains its initial duration of display. Step 340 is activated, with the timestamp T(N) modified, on completion of step 330.

In an embodiment, step 340 involves determining a new presentation timestamp $T_{MIN}$ for the following sub-titles element N+1 within the sequence of sub-titles. This minimum presentation timestamp for the sub-titles element N+1 ensures that no sub-titles element will be displayed too fast after the element N. In an embodiment of the invention, the minimum presentation timestamp of presentation $T_{MIN}$ for the element N+1 is obtained by adding a duration $T_{MD}$ to the timestamp T(N).

According to one embodiment of the invention, the duration $T_{MD}$ retains a fixed value. The value of $T_{MD}$ may be defined in order to limit the number of new sub-titles elements to 180 elements per minute. The duration $T_{MD}$ then has a value of 333 ms. This duration, or frequency of elements, can be defined in an arbitrary manner, or by using results of experiments on the users' best assessed values, such as for example the speeds listed in DTV4All, 2010. D2.5: *Final Report on Pilot Services (2 of 2), UK Evaluation Report (Roehampton)*, pp. 6 to 9.

In another embodiment of the invention, the duration $T_{MD}$ depends on the content of the sub-titles element N. For example, the duration of $T_{MD}$ may be longer if the element N contains more information. In one embodiment of the invention, the duration $T_{MD}$ is dependent on the number of words in the sub-titles element N. In another embodiment of the invention, the duration $T_{MD}$ is dependent on the number of characters in the sub-titles element N. In an embodiment of the invention, if, according to the content of the sub-titles element, the duration $T_{MD}$ obtained in this way is below a fixed threshold, for example 333 ms, it may nonetheless be fixed at the value of the threshold.

In a set of embodiments of the invention, the rules for calculating the duration $T_{MD}$ are parameterizable. Thus, an encoder according to the invention can apply the rules which have been recognized as the most relevant by a mass study. A decoder according to the invention can comprise a module allowing the user to choose the calculation rule that he or she prefers for a given program.

In one embodiment of the invention the sub-titles elements are, before the modification of the timestamp, grouped together in blocks. For example, in the case of integration of a method according to the invention into a sub-titles encoder 103a, if the sub-titles elements are organized word by word in the stream 113a, it is possible to group them together block-wise, and to consider each block as a dated element. A block may for example consist of a line, of a sentence or of a group of words.

Figure 4A:
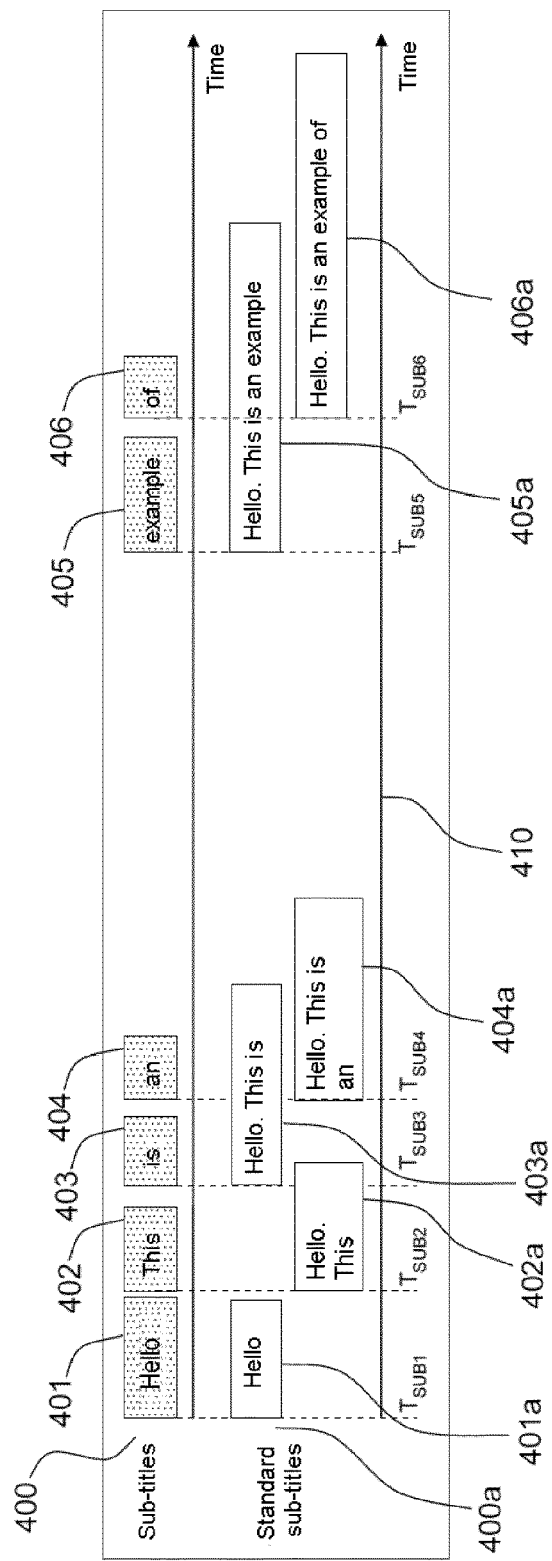
FIG. 4a is a diagram illustrating the presentation timestamps of sub-titles according to the prior art.
Figure 4B:
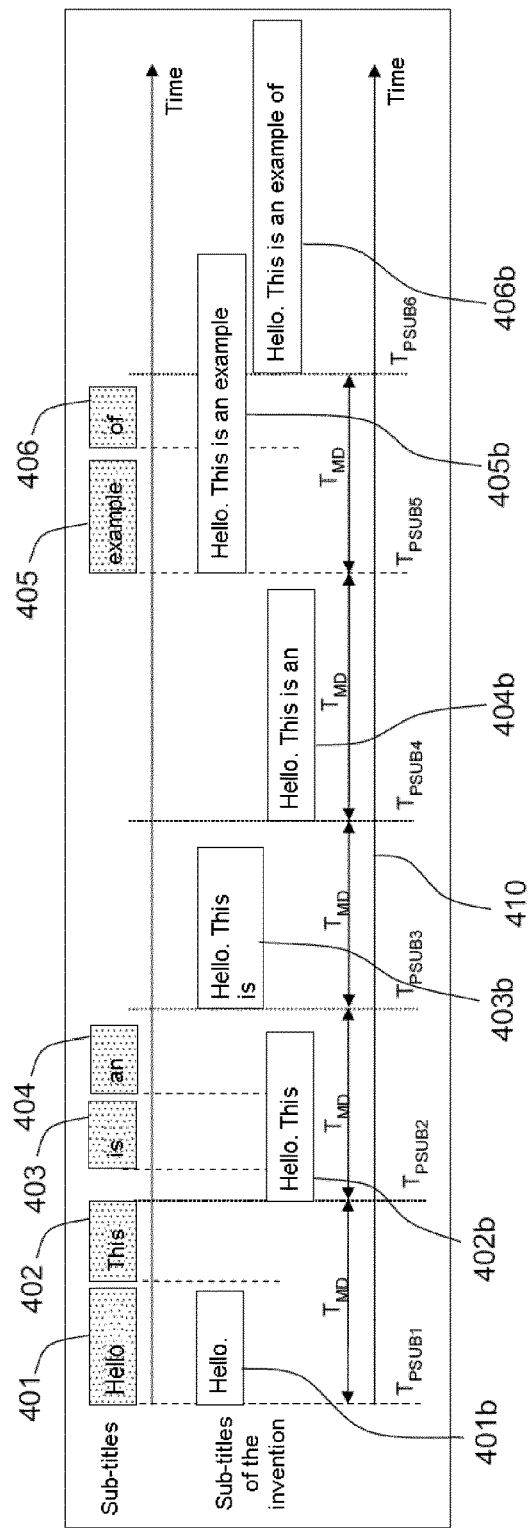
FIG. 4b is a diagram illustrating the presentation timestamps of sub-titles according to an embodiment of the invention.

FIGS. 4a and 4b represent two diagrams respectively illustrating the presentation timestamps for the sub-titles according to the prior art (FIG. 4a) and with respect to an embodiment of the invention (FIG. 4b). FIG. 4a comprises a line 400 representing the original sub-titles, a line 400a representing the display of the sub-titles according to the prior art, as well as an axis 410 representing a time scale.

The elements 401, 402, 403, 404, 405 and 406 represent elements of successive sub-titles of a sequence. Each of these sub-titles elements comprises a presentation timestamp, respectively T(401), T(402), T(403), T(404), T(405) and T(406). The standard display of these sub-titles, represented on the line 400a, consists in concatenating the sub-titles elements as and when they appear, and applying the initial presentation timestamps to them. This scheme can lead to very fast additions of words, for example between the displays of sub-titles 402a, 403a and 404a.

FIG. 4b comprises the same line 400 representing the same original sub-titles, a line 400b representing the display of the sub-titles according to an embodiment of the invention, as well as the axis 410 representing the time scale. The elements 401b, 402b, 403b, 404b, 405b and 406b represent the concatenated sub-titles elements 401, 402, 403, 404, 405 and 406, and whose presentation timestamp has optionally been modified.

In this embodiment, a fixed minimum duration $T_{MD}$ between the successive sub-titles elements is used. The presentation timestamp T(401b) is not modified with respect to the presentation timestamp T(401). A new minimum presentation timestamp $T_{MIN}$ is then calculated for the element 402, in step 340, equal to T(401b)+$T_{MD}$. In this instance, T(402)<T(401b)+$T_{MD}$. Step 330 is then activated, and the presentation timestamp for the element 402 is updated: T(402b)=T(401b)+$T_{MD}$. In the same manner, T(403)<T(402b)+$T_{MD}$, therefore the presentation timestamp associated with the element 403 is updated: T(403b)=T(402b)+$T_{MD}$. T(404)<T(403b)+$T_{MD}$, therefore the presentation timestamp associated with the element 404 is updated: T(404b)=T(403b)+$T_{MD}$. On the other hand, T(405)>T(404b)+$T_{MD}$, the presentation timestamp T(405b) is therefore equal to T(405).

The application of the invention makes it possible in this example to limit the speed of display of the successive sub-title words, and therefore to produce more pleasant sub-titles for the user. In particular, the speed of appearance of the sub-titles elements 402, 403 and 404 is slowed down, whilst the timestamp of appearance of the element 405 is retained.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for applying a presentation timestamp to an element of a sequence of sub-titles, wherein execution of the one or more sequences of instructions by one or more processors causes:
    initializing a minimum presentation timestamp $T_{MIN}$ of the element of the sequence of sub-titles N;
    comparing the presentation timestamp T(N) of a new element of a sub-title sequence N and the minimum presentation timestamp for sub-titles $T_{MIN}$;
    applying the minimum presentation timestamp for sub-titles $T_{MIN}$ to the element of the sequence of sub-titles N if the presentation timestamp T(N) of the new sub-titles element is prior to the minimum presentation timestamp for sub-titles $T_{MIN}$; and
    calculating and applying the minimum presentation timestamp for sub-titles $T_{MIN}$ for an element of a sequence of sub-titles N+1 as a timestamp posterior to the presentation timestamp T(N) of the new sub-titles element.

2. The one or more non-transitory computer-readable storage mediums of claim 1, wherein the minimum presentation timestamp for sub-titles $T_{MIN}$ is recalculated by adding a duration $T_{MD}$ to the presentation timestamp T(N).

3. The one or more non-transitory computer-readable storage mediums of claim 2, wherein the duration $T_{MD}$ retains a fixed value.

4. The one or more non-transitory computer-readable storage mediums of claim 2, wherein the duration $T_{MD}$ is dependent on the size of the sub-titles element N.

5. The one or more non-transitory computer-readable storage mediums of claim 4, wherein the duration $T_{MD}$ is dependent on the number of words of the sub-titles element N.

6. The one or more non-transitory computer-readable storage mediums of claim 4, wherein the duration $T_{MD}$ is dependent on the number of characters of the sub-titles element N.

7. The one or more non-transitory computer-readable storage mediums of claim 1, wherein executing the one or more sequences of instructions further cause:
    forming the element of the sequence of sub-titles N by grouping several words into a block.

8. The one or more non-transitory computer-readable storage mediums of claim 7, wherein the block contains a sentence.

9. The one or more non-transitory computer-readable storage mediums of claim 7, wherein the block contains a line of words.

10. The one or more non-transitory computer-readable storage mediums of claim 1, wherein the presentation timestamp is written in a multimedia stream.

11. The one or more non-transitory computer-readable storage mediums of claim 10, wherein the multimedia stream is an MPEG-TS stream.

12. The one or more non-transitory computer-readable storage mediums of claim 10, wherein the multimedia stream includes a sub-titles stream according to one of the TTML norms of the W3C.

13. The one or more non-transitory computer-readable storage mediums of claim 1, wherein the presentation timestamp of the sub-titles element is provided to a video decoder for display.

14. An apparatus for applying a presentation timestamp to an element of a sequence of sub-titles, comprising:
    one or more processors; and
    one or more non-transitory computer-readable storage mediums storing one or more sequences of instructions, which when executed, cause:
        initializing a minimum presentation timestamp $T_{MIN}$ of the element of the sequence of sub-titles N;
        comparing the presentation timestamp T(N) of a new element of a sub-title sequence N and the minimum presentation timestamp for sub-titles $T_{MIN}$;
        applying the minimum presentation timestamp for sub-titles $T_{MIN}$ to the element of the sequence of sub-titles N if the presentation timestamp T(N) of the new sub-titles element is prior to the minimum presentation timestamp for sub-titles $T_{MIN}$; and
        calculating and applying the minimum presentation timestamp for sub-titles $T_{MIN}$ for an element of a sequence of sub-titles N+1 as a timestamp posterior to the presentation timestamp T(N) of the new sub-titles element.

15. The apparatus of claim 14, wherein the minimum presentation timestamp for sub-titles $T_{MIN}$ is recalculated by adding a duration $T_{MD}$ to the presentation timestamp T(N).

16. The apparatus of claim 15, wherein the duration $T_{MD}$ retains a fixed value.

17. The apparatus of claim 15, wherein the duration $T_{MD}$ is dependent on the size of the sub-titles element N.

18. The apparatus of claim 17, wherein the duration $T_{MD}$ is dependent on the number of words of the sub-titles element N.

19. The apparatus of claim 17, wherein the duration $T_{MD}$ is dependent on the number of characters of the sub-titles element N.

20. The apparatus of claim 14, wherein executing the one or more sequences of instructions further cause:
    forming the element of the sequence of sub-titles N by grouping several words into a block.

21. The apparatus of claim 20, wherein the block contains a line of words or a sentence.

22. The apparatus of claim 14, wherein the presentation timestamp is written in a multimedia stream.

23. The apparatus of claim 22, wherein the multimedia stream is an MPEG-TS stream.

24. A method of applying a presentation timestamp to an element of a sequence of sub-titles, comprising:
    executing upon hardware comprising one or more processors, initializing a minimum presentation timestamp $T_{MIN}$ of the element of the sequence of sub-titles N, by an encoder, transcoder, or decoder;
    comparing the presentation timestamp T(N) of a new element of a sub-title sequence N and the minimum presentation timestamp for sub-titles $T_{MIN}$, by the encoder, transcoder, or decoder;

applying the minimum presentation timestamp for sub-titles $T_{MIN}$ to the element of the sequence of sub-titles N if the presentation timestamp T(N) of the new sub-titles element is prior to the minimum presentation timestamp for sub-titles $T_{MIN}$, by the encoder, transcoder, or decoder; and calculating and applying the minimum presentation timestamp for sub-titles $T_{MIN}$ for an element of a sequence of sub-titles N+1 as a timestamp posterior to the presentation timestamp T(N) of the new sub-titles element, by the encoder, transcoder, or decoder.

* * * * *